United States Patent
McClure

(10) Patent No.: US 6,865,465 B2
(45) Date of Patent: Mar. 8, 2005

(54) METHOD AND SYSTEM FOR IMPLEMENT STEERING FOR AGRICULTURAL VEHICLES

(75) Inventor: John A. McClure, Scottsdale, AZ (US)

(73) Assignee: CSI Wireless, Inc., Alberta (CA)

( * ) Notice: Subject to any disclaimer, the term of this patent is extended or adjusted under 35 U.S.C. 154(b) by 0 days.

(21) Appl. No.: 10/431,119

(22) Filed: May 6, 2003

(65) Prior Publication Data

US 2003/0208311 A1 Nov. 6, 2003

Related U.S. Application Data

(60) Provisional application No. 60/380,110, filed on May 6, 2002.

(51) Int. Cl.$^7$ .................................................. G06G 7/76
(52) U.S. Cl. ........................ 701/50; 701/213; 701/214
(58) Field of Search ........................ 701/215, 50, 210, 701/213, 207, 708, 707, 214, 36, 300, 1; 342/357.03, 357.02, 357.06, 357.08, 357.11; 172/2, 5

(56) References Cited

U.S. PATENT DOCUMENTS

| 5,156,219 A | 10/1992 | Schmidt et al. ................ 172/5 |
| 5,941,317 A | 8/1999 | Mansur ........................... 172/2 |
| 6,397,147 B1 | 5/2002 | Whitehead ..................... 701/213 |
| 6,434,462 B1 * | 8/2002 | Bevly et al. ..................... 701/50 |
| 6,469,663 B1 | 10/2002 | Whitehead et al. ..... 342/357.03 |
| 6,553,299 B1 * | 4/2003 | Keller et al. .................... 701/50 |
| 2002/0072850 A1 | 6/2002 | McClure et al. ............ 701/213 |

FOREIGN PATENT DOCUMENTS

WO    WO 02/080652 A1    10/2002    ........... A01B/69/00

* cited by examiner

Primary Examiner—Richard M. Camby
(74) Attorney, Agent, or Firm—Cantor Colburn LLP

(57) ABSTRACT

A guidance system for directing a towed implement comprising: a first DGPS system, comprising an antenna located on a towing vehicle in operable communication with a receiver; a second DGPS system comprising another antenna located on a towed implement in operable communication with another receiver; a receiver configured to receive differential correctors from a reference GPS system; a controller in operable communication with the first DGPS system, the second DGPS system, and the receiver, the controller generating a first steering command; and a steering mechanism in operable communication with the controller and configured to direct a towed implement based on the first steering command provided thereto.

14 Claims, 2 Drawing Sheets

METHOD AND SYSTEM FOR IMPLEMENT STEERING FOR AGRICULTURAL VEHICLES

CROSS-REFERENCE TO RELATED APPLICATIONS

This application claims the benefit of U.S. provisional application No. 60/380,110, filed May 6, 2002 the contents of which are incorporated by reference herein in their entirety.

FIELD OF THE INVENTION

The inventions relates to the use of a high accuracy DGPS system, operating as a BASE station and dual ROVER units to enable precision guidance and positioning of agricultural implements normally towed behind a tractor.

BACKGROUND

There is a need to accurately position agricultural implements used for planting crops. This maximizes yield by avoiding overlapping and gaps between rows which result in lower yield and increased costs and crop damage. As farming becomes increasingly mechanized and farm implements larger and larger so too does the difficulty of making each pass match precisely against the previous one. Cultivators and harvesters typically have different number of rows from that used on the planter. This makes it critical to ensure spacing remains the same from one pass to the next, as when the next vehicle comes down the row it may lie between two passes of the previous vehicle.

The standard approach, borrowed from the days of horse drawn ploughs, has been to use mechanical means to make a furrow in the ground to indicate where to guide on the following pass. This has evolved into the use of hydraulically activate disk marker arms which automatically swing in and out at the end of the towed implement at the end of every pass through the field to make this guide furrow for the next pass. As tractors have become larger with increased towing power, as fields have become larger to increase efficiency, so too has the size of the towed implement. As the implement size increases so too must the size and complexity of this swing arm.

Several agricultural implement manufacturers have devised additional wand sensors on the towed implement to automatically feel the edges of this guide furrow and adjust the lateral position of the towed implement by way of a free swinging three point hitch. This mechanism allows for correction of positional errors of the tractor up to around +−6 inches.

For some years Differential Global Positioning Systems (DGPS) have been used as a tool for agricultural guidance. Improvements in DGPS accuracy have now attained accuracies below the one-inch level. In some systems, this allows the driver to steer the tractor using a guidance display with improved precision. Several auto-steer systems are currently in use which take this guidance information and apply it directly to the steering mechanism of the tractor. This alleviates the driver from the fatigue of continuously responding to visual signals to keep the tractor on track, with the towed implement following behind.

This, however, does not control the towed implement, typically containing the planting or ploughing mechanisms. As these towed implements have become larger so too have the lateral positioning effects, which can shift their position relative to the towed tractor. Even if the tractor remains faithful to it's steering commands, visual or auto-steered, this can result in the tractor driving straight but the implement not remaining on track. Unfortunately, with the implement out of track, degraded performance results. On sloping ground, or ground with variation in texture or moisture content, this can give serious errors in the positioning of the furrows or plant positioning.

SUMMARY OF EXEMPLARY EMBODIMENTS OF THE INVENTION

Disclosed herein in an exemplary embodiment is a guidance system for directing a towed implement comprising: a first DGPS system, comprising an antenna located on a towing vehicle in operable communication with a receiver; a second DGPS system comprising another antenna located on a towed implement in operable communication with another receiver; a receiver configured to receive differential correctors from a reference GPS system; a controller in operable communication with the first DGPS system, the second DGPS system, and the receiver, the controller generating a first steering command; and a steering mechanism in operable communication with the controller and configured to direct a towed implement based on the first steering command provided thereto.

Also disclosed herein in an exemplary embodiment is a method for steering a towed implement comprising: receiving a differential corrector from a reference DGPS system; receiving a first position from a first DGPS system corresponding to a position of the towing vehicle; receiving a second position from a second DGPS system corresponding to a position of the towed implement; and computing a corrected position for the towed implement. For each desired swath, the method also includes; computing a desired track and cross track error; computing a steering correction for the towed implement; and generating a first steering command.

These and other improvements are set forth in the following detailed description. For a better understanding of the invention with advantages and features, refer to the description and to the drawings.

BRIEF DESCRIPTION OF THE DRAWINGS

The present invention will now be described, by way of an example, with references to the accompanying drawings, wherein like elements are numbered alike in the several figures in which.

DETAILED DESCRIPTION OF THE INVENTION

An embodiment of the invention uses high resolution DGPS data from two sources, one based on the tractor for its guidance and the other mounted on an implement. The tractor DGPS is used for manual or auto-steer and to generate master lines, either straight or contour following that a particular pass is planned to follow. The implement DGPS is positioned relative to that desired track and a proportional error signal applied to a control system on the implement, configured to adjust its position. Advantageously, this means that the mechanical disk marker arm does not have to be used. This saves time at the end of each pass for folding in on one side and folding out on the other and in maintenance, repair and downtime costs. Moreover, the furrow in the dirt can become obscured by wind, blowing dust, darkness or soil conditions making it impossible for the operator to follow. If the furrows cannot be sensed by the feeling sensor wands the implement cannot be corrected.

Employing the technique described herein in an exemplary embodiment eliminates the abovementioned problems, allowing substantially 24-hour operation of the equipment, greater accuracies, and higher agricultural efficiencies.

It will be appreciated that use may be made of real time kinematic (RTK) differential GPS techniques using a local base station transmitting correctors, though as DGPS accuracies improve it may be possible to also use satellite, beacon based or inertial aided systems. Such techniques are disclosed in U.S. Pat. No. 6,469,663 entitled METHOD AND SYSTEM FOR GPS AND WAAS CARRIER PHASE MEASUREMENTS FOR RELATIVE POSITIONING, to Whitehead et al., the entire contents of which are incorporated herein by reference. In addition, an exemplary embodiment of the invention may utilize DGPS techniques such as those disclosed in U.S. Pat. No. 6,397,147 entitled RELATIVE GPS POSITIONING USING A SINGLE GPS RECEIVER WITH INTERNALLY GENERATED DIFFERENTIAL CORRECTION TERMS, the entire contents of which are incorporated herein by reference. Additionally, an exemplary embodiment of the invention may employ techniques and applications disclosed in U.S. patent application Ser. No. 09/733,641, published patent application number 20020072850, entitled GPS DERIVED SWATH GUIDANCE SYSTEM, the entire contents of which are incorporated herein by reference.

Figure 1:
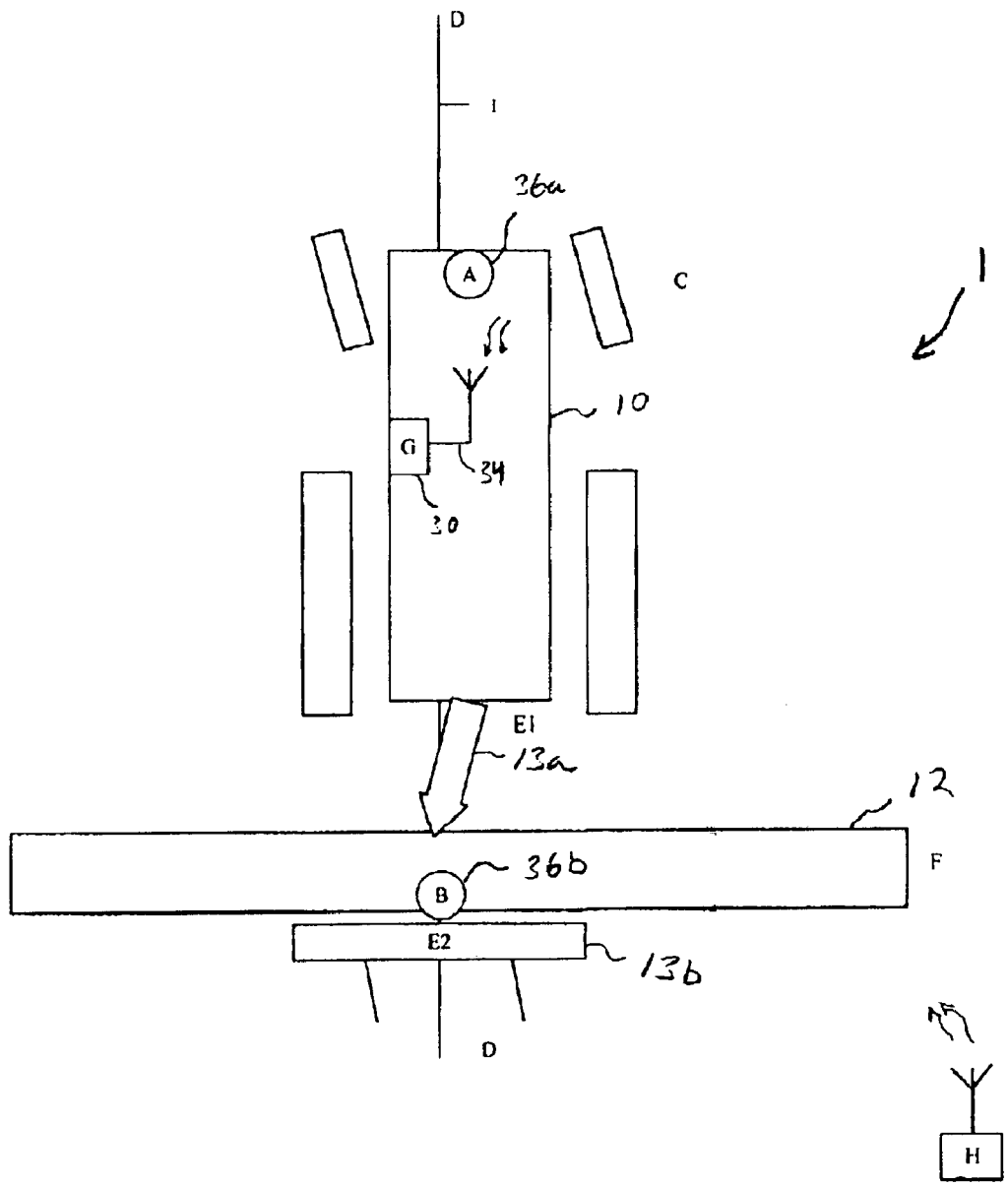
FIG. 1 is a simplified block diagram depicting a system for implement steering for an agricultural vehicle in accordance with an exemplary embodiment.

Referring now to FIG. 1, an exemplary embodiment of a system 1 for implement steering for agricultural vehicles. The system 1 employs a tractor 10 towing and implement 12 and DGPS is used for manual or auto-steering corrections to a steering mechanism 11 to establish and follow either straight or contour lines that tractor and/or implement 12 is to follow for a particular pass. In an exemplary embodiment the implement 12 is positioned relative to that desired track denoted as D—D in the figure, and a proportional error signal applied to the control system on the implement 12, which can laterally adjust its position. This control system can be in the form of a three-point hitch 13a, laterally moving the point of towing on the tractor or by the use of coulter disks 13b, which act as the rudder on a boat to swing the towed implement laterally relative to the towing position on the tractor. This second approach has been demonstrated to be able to position and maintain the towed implement several feet to the side of it's normally pulled straight track.

Continuing with the figure, the system 1 uses radio communication to transmit correctors from a reference base station 20 to one or more rover receivers 32 preferably mounted on the agricultural vehicle, hereinafter denoted as a tractor 10 and to achieve the sub inch level positioning accuracy desired. The reference base station 20 GPS system is setup locally to generate the required correctors and transmit them to the tractor systems. The base station includes a GPS antenna and receiver system in communication with a radio transmitter to facilitate communication with the tractor 10. A single radio receiver 34 preferably part of a control module 30 on the tractor 10 may be used to receive these digital corrector signals and communicate them to both Rover DGPS receivers 32, also preferably, but not necessarily part of the control module 30. The control module 30 may include, but not be limited to the two DGPS receivers 32, radio link receiver 34 for correctors, and an operator display (not shown). The control module provides an auto steer output (if installed), implement control output to direct steering of the implement 12. A GPS antenna 36a placed suitably as far forward as possible on the tractor 10 to provide timely guidance display and operation in response to wheel movements on the tractor 10. Advantageously, responsiveness may also be improved by using an improved heading sensor, such as multi-antenna DGPS systems, gyroscope or other form of heading input. An example of such a system is disclosed in U.S. Provisional Patent Application Ser. No. 60/456,146 entitled Satellite Position and Heading Sensor For Vehicle Steering Control, the entire contents of which are incorporated herein by reference. The guidance information, including, but not limited to, left/right excursion and required rate of turn information to the desired track may readily be supplied to an operator guidance display and any auto steer component fitted to the tractor 10. The desired track information, as indicated by D—D in the figure, either as a straight line or a contour curve relative to previous passes, may be sent to a second DGPS receiver 32 with it's antenna 36b mounted on the movable implement 12. Preferably, a suitable mounting arrangement is provided for the antennae to ensure minimal reflection effects and satellite reception masking from the tractor 10. In an exemplary embodiment the real time position of the implement 12 is ascertained based on the position computed with the implement mounted GPS antenna 36b, which is used to calculate the instantaneous offset from the desired track D—D. In the FIG. 1 denotes the linear magnitude of the track error for the tractor 10, here the tractor is depicted to the right of the D—D desired track line and moving towards the line.

Communication between systems e.g., GPS, communications, controls, auto-steering, and the like may either be accomplished with a multi-tasking computer e.g. control module 30 or between separate processors in the modules e.g., GPS receiver(s) 32, and the like, communicating on a Controller Area Network (CAN), Bluetooth radio, serial bus or any other interprocessor communication methodology or standard.

An error signal, in an exemplary embodiment, analog, but this can also be serial and CAN bus data packets, is made available to the mechanical system controlling the lateral movement of the implement 12 to correct for the error. The error signal is part of a feedback control loop that continuously adjusts position of the implement. This signal is proportional and is inherently stable when the system gain is maintained below a selected point. System time constants on the order of several seconds are permissible to reduce any fluctuations, as the large masses of the tractor 10 and implement 12 involved move quite slowly laterally. High resolution positioning may be used on both tractor based and implement bases ROVER GPS unit(s) 32 to obtain the accuracy desired for this application.

It will be appreciated that the tractor 10 need not be driven perfectly e.g., exactly on the desired track) by the driver or the auto-steer mechanism to enable correct operation of the system 1. Advantageously, the towed implement 12 also need not have the same excursion of lateral travel as the tractor 10, as long as the tractor "oscillates" back and forth down the desired track D—D. It will be further appreciated that this is how current operations are performed with the driver visually following a line in the soil.

In another exemplary embodiment various safety features may readily be built into the system 1. The system 1 may be configured to application of corrections to the steering mechanism on the tractor 10 when the correction required exceeds a selected threshold. In addition software control or a mechanical override may be employed to disable, zero, or null the corrections.

In an exemplary embodiment, the reference GPS unit 20 generates corrections and sends them to a ROVER receiving system 32 on board the tractor 10. As mentioned above, this communication may be via radio, internet/cell phone connection, and the like. These corrections are made available to the two ROVER GPS receivers on the tractor 10 to enable high accuracy, low latency, positions to be computed.

In an exemplary embodiment, the guidance, ROVER antenna 36a for the tractor system is mounted forward to yield good response to wheel motions and the positional and velocity data is made available to the guidance software. Similarly, the implement based ROVER antenna 36b is mounted on the implement, high to be away from reflections from the tractor 10 itself.

In an exemplary embodiment for a parallel mode of operation the A and B points of the master line for the desired track D—D are generated. This allows the guidance system to give graphical displays to the operator and/or control information to a steering system. An implement steering application uses these A and B points to compute the real time cross track error distance from this line for the implement 12. An error signal, analog, digital, and the like is passed to the mechanical control system for the implement steering system 13a, 13b. The implement steering system 13a, 13b then adjusts the position of the implement 12 laterally to minimize the cross track error. Gain and limits on excursion of travel and minimum speed operation are user selectable in the application to minimize any overshoot of the system 1 or to disable operation when stationary.

Possible corrections for the implement 12 are of the order of six inches for three point hitches 13a to several feet for large towed array implements 12 such as planters employing coulter disc systems 13b. It will be appreciated that with such a configuration for the system, as long as the operator is able to manually control the tractor 10, or for auto-steering systems, the steering system is able to control the tractor 10, within a few feet of the desired line D—D and the system moves back and forth across the desired line every few seconds the towed implement 12 will be within the controllability zone of the adjustable hitch steering mechanism 13a, 13b.

In another exemplary embodiment for a contour mode the system 1 generates a continuous line that the system 1 guides against, offset by one swath width for each pass. The system continuously calculates a cross track error relative to that continuous line and adjusts its lateral position to minimize the error. The abovementioned exemplary embodiments provide superior swathing results when compared to manually driven methods using the mechanical disk markers.

Figure 2:
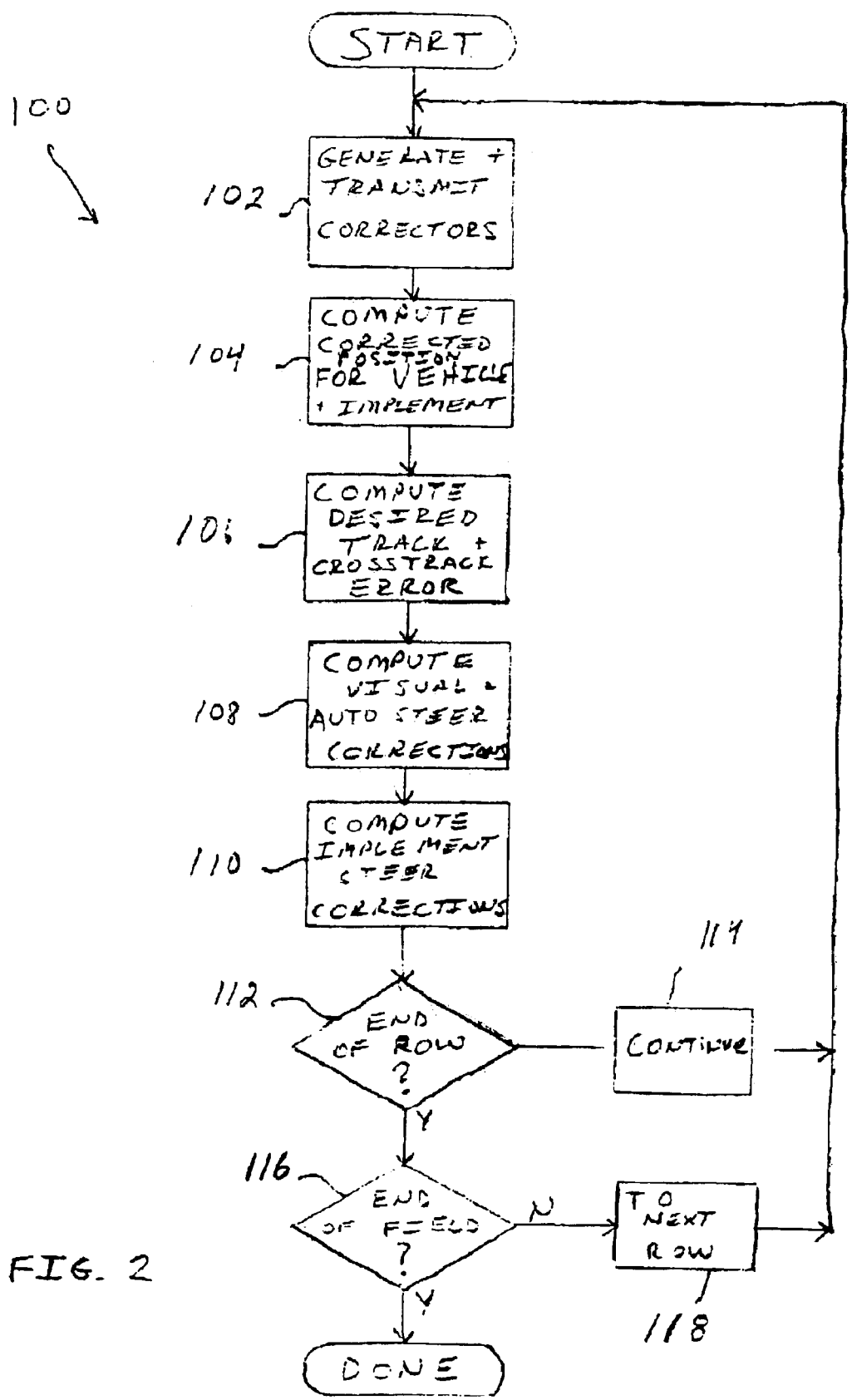
FIG. 2, is a simplified flow chart depicting a methodology for positioning an implement.

Referring now to FIG. 2, a methodology 100 for positioning the implement 12 over an area (e.g., a field) is depicted. In an exemplary embodiment the methodology 100 is initiated by continuous generation of BASE or reference correctors from the reference GPS system 20 as depicted at process block 102. Process block 102 also depicts the corrections being up-linked (transmitted) to the rover GPS systems 32. The continuously corrected tractor rover and implement rover positions are computed on board as depicted at process block 104. At process block 106, the system 1 computes the desired track based on a selected swathing mode. For example, generation of Master Line, marked A and B or initial contour line. Process blocks 108 entails the calculation and display of visual or auto-steer corrections for tractor guidance. The calculation, display and application of implement steer corrections to implement steer control system are depicted at process block 110. At decision block 112 it is determined if the end of a row or swath has been attained. If so, the process 100 continues as depicted at process block 114. Otherwise, the methodology 100 continues to decision block 116 to ascertain whether the field has been completed. If not the methodology continues to the next row or swath as depicted at process block 118 otherwise, the methodology 100 is complete for the selected field.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A guidance system for directing a towed implement comprising:
    a first DGPS system, comprising an antenna located on a towing vehicle in operable communication with a receiver;
    a second DGPS system comprising another antenna located on a towed implement in operable communication with another receiver;
    a receiver configured to receive differential correctors from a reference GPS system;
    a controller in operable communication with said first DGPS system, said second DGPS system, and said receiver, said controller generating a first steering command;
    a steering mechanism on a towed implement in operable communication with said controller and configured to direct a towed implement based on said first steering command provided thereto.

2. The guidance system of claim 1 further including said controller generating a second steering command and further including another steering mechanism in operable communication with said controller and configured to direct said towing vehicle based on said second steering command provided thereto.

3. The guidance system of claim 2 wherein said controller generates at least one of straight and contour guidance information based on a position front said first DGPS system for at least one of numerical display, graphical display, and auto-steering of said towing vehicle.

4. The guidance system of claim 1, wherein at least one of said DGPS system and said second DGPS system comprises a differential source configured to satisfy selected accuracy requirements, at least one of said DGPS system and said second DGPS system including at least one of, carrier phase RTK, a satellite based differential system, and ground based differential system.

5. The guidance system of claim 1 wherein said controller generates at least one of straight and contour guidance information based on said second DGPS system relative to a towing vehicle guidance line, for at least one of numerical display, graphical display, and implement steering.

6. The system of claim 1 wherein said steering mechanism is a three-point hitch and said first steering command is configured for positional correction thereof.

7. The system of claim 1 wherein said steering mechanism is a coulter disk and said first steering command is configured for coulter disk angle of attack correction.

8. A method for steering a towed implement comprising:

generating a differential corrector at a reference DGPS receiver and transmitting said differential corrector of a towing vehicle;

receiving said differential corrector;

receiving a first position from a first DGPS system corresponding to a position or said towing vehicle;

receiving a second position from a second DGPS system corresponding to a position or said towed implement;

computing a corrected position for said towed implement; and for each desired swath:

computing a desired track and cross track error computing a steering correction for said towed implement; and generating a first steering command to a first steering mechanism on said towed implement.

9. The method of claim 8 further including:

generating a second steering command to another steering mechanism in operable communication with said controller, said another steering mechanism configured to direct said towing vehicle based on said second steering command.

10. The method of claim 8 further including generating at least one or straight and contour guidance information based on a position from said first DGPS system for at least one of numerical display, graphical display, and auto-steering of said towing vehicle.

11. The method of claim 8, wherein said DGPS comprises a differential source configured to satisfy selected accuracy requirements, said DGPS including at least one of, carrier phase RTK, a satellite based differential system, and ground based differential system.

12. The method of claim 8 further including generating at least one of straight and contour guidance information based on said second DGPS system relative to a towing vehicle guidance line, for at least one of numerical display, graphical display, and implement steering.

13. The method of claim 8 wherein said first steering command is configured for positional correction of a three-point hitch steering mechanism.

14. The system of claim 8 wherein said first steering command is configured for correction based on coulter disk angle of attack correction for a coulter disk steering mechanism.

* * * * *